UNITED STATES PATENT OFFICE 2,655,482

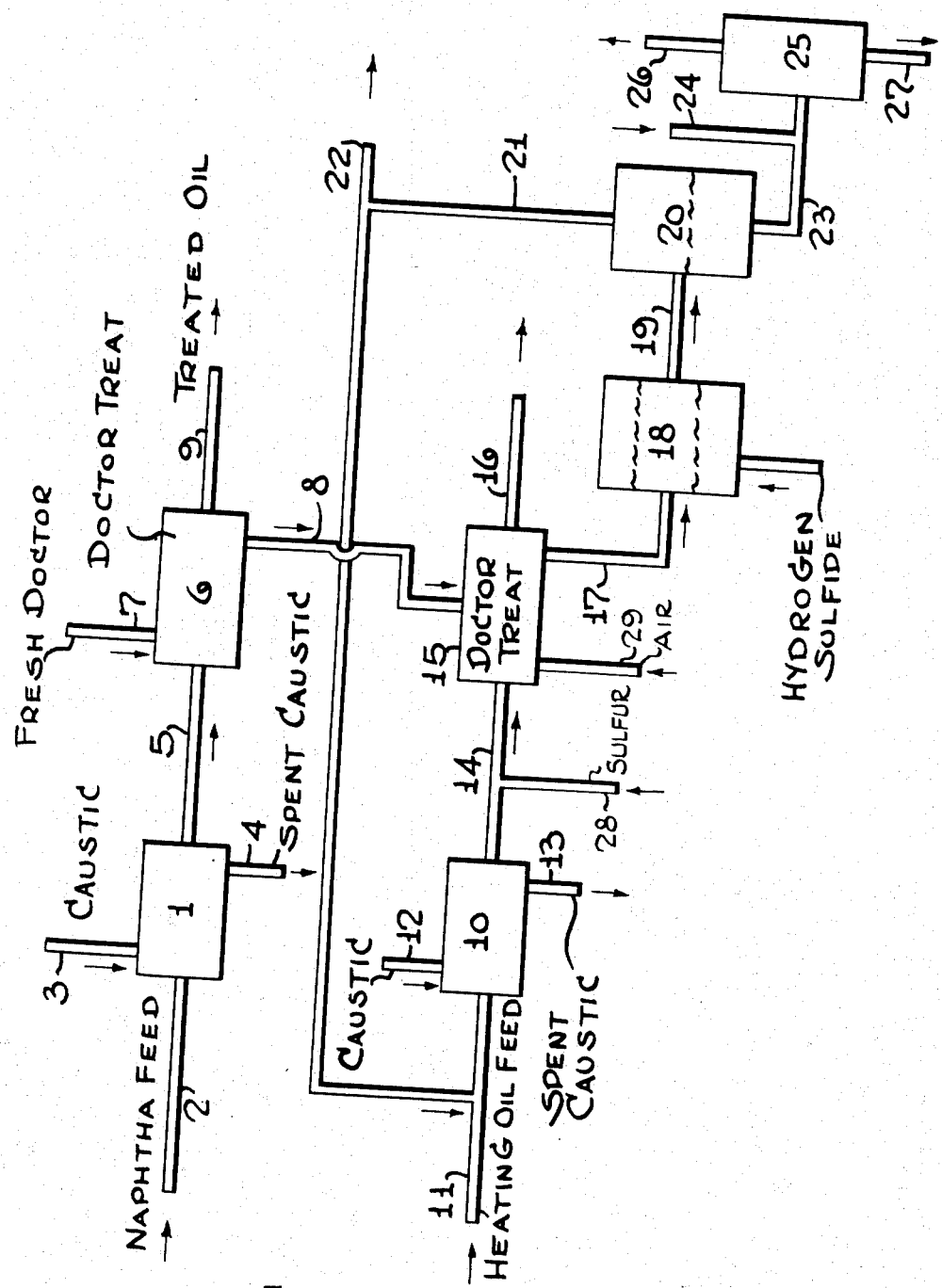

RECOVERY OF USEFUL PRODUCT FROM SPENT DOCTOR

John B. Holtzclaw, Roselle, and John D. Brooks, Elizabeth, N. J., assignors to Standard Oil Development Company, a corporation of Delaware Application July 23, 1952, Serial No. 300,538

2 Claims. (Cl. 252—183)

The present invention is concerned with a process for segregating valuable products from a spent doctor or alkali metal plumbite solution. The invention is more particularly concerned with a process for the treatment of a doctor solution which has been used in the treatment of mercaptan containing naphthas and heating oils. In accordance with the present invention, a solution having a high sodium sulfide content suitable for utilization in the manufacture of paper is segregated from a spent doctor solution by a process which involves saturating the spent doctor solution with hydrogen sulfide, followed by the separation of the segregated layer and treatment of the segregated layer with a caustic solution, followed by reconcentration.

It is well known in the art to treat various petroleum fractions with a doctor or sodium plumbite solution. In these processes the sodium plumbite solution converts the mercaptans to lead mercaptides which are then treated with free sulfur to form disulfides and lead sulfide.

The doctor or plumbite solution is prepared by dissolving lead oxide in sodium hydroxide as follows:

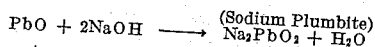

Upon treatment of the mercaptan containing oil fraction with the sodium plumbite solution the normal lead mercaptide and basic lead mercaptide are formed as follows:

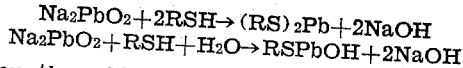

Upon the addition of sulfur the relatively innocuous disulfides are formed and lead sulfide is precipitated as follows:

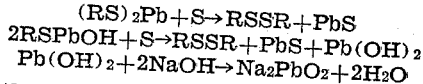

In these reactions the spent doctor solution is regenerated as follows:

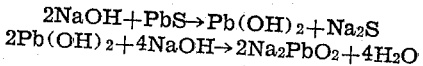

However, in time sodium thiosulfate tends to build up in the spent doctor by the action of oxygen from the air on the sodium sulfide.

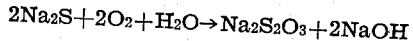

When the spent doctor from the naphtha treating operation is utilized for the treatment of heating oils, the solution is blown with air in a manner to convert the aromatic mercaptans to polysulfides. The spent doctor solution withdrawn from the heating oil treatment contains an appreciable quantity of thiosulfates. In accordance with the present invention, this spent solution is passed to a settling zone wherein the same is contacted with hydrogen sulfide.

The process of the present invention may be more fully understood by reference to the drawing illustrating an embodiment of the same. Referring specifically to the drawing, a hydrocarbon feed boiling in the range from about 100° F. to 430° F. is introduced into caustic treating zone 1 by means of line 2. Caustic is introduced into zone 1 by means of line 3 and withdrawn as spent caustic by means of line 4. The treated oil is withdrawn from zone 1 by means of line 5, and passed to a doctor treating zone 6. The fresh doctor solution is introduced into zone 6 by means of line 7 while the spent doctor is withdrawn by means of line 8. A treated oil is withdrawn from zone 6 by means of line 9 and further handled or refined as desired. It is to be understood that zones 1 and 6 may comprise any suitable number and arrangement of stages.

A heating oil fraction boiling in the range from about 430° F. to 750° F. is introduced into caustic treating zone 10 by means of line 11. Fresh caustic is introduced into zone 10 by means of line 12 while spent caustic is removed by means of line 13. A treated oil is removed from zone 10 and sulfur is added by means of line 28. The solution is passed to a doctor treating zone 15 wherein the same is contacted with the doctor solution withdrawn from zone 6. Air is blown into the treating zone by means of line 29. A heating oil product is removed from zone 15 by means of line 16 and further handled or refined as desired. The spent doctor solution is withdrawn from zone 15 by means of line 17 and passed into a settling zone 18. The solution segregates into a top oil layer containing dissolved therein oil soluble lead soaps of naphthenic acids. A middle layer segregates which contains lead sulfide, sodium hydroxide, sodium soaps, and sodium naphthenates. A lower water layer segregates which contains free caustic sodium plumbite and sodium thiosulfates.

In accordance with the present invention, this solution is saturated with hydrogen sulfide. The solution is then passed into zone 20 by means of line 19 wherein the same segregates into an upper oil layer which contains naphthenic acids. This oil layer is withdrawn by means of line 21 and is preferably recycled to line 11. The oil layer however may be withdrawn from the system by means of line 22. By recycling the oil layer to zone 10, the naphthenic acids are removed with the spent caustic withdrawn by means of line 13. The lower water layer is withdrawn from zone 20 by means of line 23 and is mixed with caustic free of naphthenic acids introduced by means of line 24. The solution is passed into distillation zone 25 wherein temperature and pressure conditions are adjusted to remove water overhead by means of line 26. A sodium sulfide solution suitable for the manufacture of paper containing from about 15% to 40% of sodium sulfur salts is withdrawn from zone 25 by means of line 27.

The present invention is broadly concerned with the manufacture of a sodium sulfide solution from a spent doctor solution. The spent doctor solution is one which is secured by first treating a petroleum fraction boiling in the naphtha boiling range and then treating a petroleum fraction boiling in the heating oil boiling range. The process of the present invention may be more fully understood by the following example illustrating the same:

Example

A sodium plumbite solution was used to contact a hydrocarbon boiling in the range from about 100° F. to 430° F. The spent doctor solution was then used to contact a heating oil boiling in the range from about 550° F. to 700° F. The spent solution was allowed to stand wherein three layers formed of the following amount:

| | Vol. per cent |
|---|---|
| Upper layer | 43.6 |
| Intermediate layer | 23.3 |
| Lower layer | 33.1 |
| Total | 100.00 |

The segregated mass was treated with hydrogen sulfide resulting in the formation of two layers. The upper oil layer comprised 51.5% of the total, the lower water layer comprised 48.5% of the total. The oil layer contained 6% naphthenic acids and 94% oil, while the water layer contained 5.9% sodium thiosulfate, 7.9% sodium bisulfide and 86.2% water. Excess $H_2S$ is neutralized by the addition of an alkali metal hydroxide solution, and the solution concentrated.

The present invention is directed broadly toward the production of a satisfactory alkali metal, particularly sodium sulfur salts for use in the paper industry. By utilizing a spent doctor solution secured from the treating of naphthas and heating oils, relatively wide boiling sodium sulfur salts are secured. The heavy intermediate emulsion layer secured prior to saturating with hydrogen sulfide comprises sodium naphthenates. After contact with hydrogen sulfide, the naphthenic acids are dissolved in the oil and are recycled, while the sodium sulfur salts concentrate in the water layer. Under some conditions a sediment layer forms after treatment with hydrogen sulfide which is segregated and discarded.

What is claimed is:

1. Improved process for the production of a solution comprising sodium sulfur salts which comprises contacting an initial hydrocarbon mixture containing mercaptans and boiling in the motor fuel boiling range with a doctor solution, thereafter using said doctor solution to contact a secondary hydrocarbon mixture containing mercaptans, and boiling in the heating oil boiling range, withdrawing the spent doctor and saturating the same with hydrogen sulfide whereby an upper oil layer containing naphthenic acids and a lower layer containing sodium sulfur salts form, treating said lower layer with an alkali metal hydroxide solution and thereafter concentrating the same.

2. Process as defined by claim 1 wherein said initial hydrocarbon boils in the range from about 100° F. to 430° F. and wherein said secondary hydrocarbon mixture boils in the range from about 430° F. to 750° F.

JOHN B. HOLTZCLAW.
JOHN D. BROOKS.

References Cited in the file of this patent

UNITED STATES PATENTS

| Number | Name | Date |
|---|---|---|
| 2,336,109 | Lowry et al. | Dec. 7, 1943 |
| 2,370,819 | Staid et al. | Mar. 6, 1945 |
| 2,515,141 | Stripling | July 11, 1950 |